US012718087B2

(12) United States Patent
Yin et al.

(10) Patent No.: US 12,718,087 B2
(45) Date of Patent: Aug. 25, 2026

(54) DEEP LEARNING SOFTWARE MODEL MODIFICATION

(71) Applicant: INTERNATIONAL BUSINESS MACHINES CORPORATION, Armonk, NY (US)

(72) Inventors: Kun Yan Yin, Ningbo (CN); Hong Bing Zhang, Beijing (CN); Xue Ping Liu, Beijing (CN); Shen Qi, Ningbo (CN); Jian Long Pan, Wu Han (CN)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 17/444,676

(22) Filed: Aug. 9, 2021

(65) Prior Publication Data

US 2023/0043505 A1 Feb. 9, 2023

(51) Int. Cl.
*G06N 3/063* (2023.01)
*G06N 3/08* (2023.01)
(Continued)

(52) U.S. Cl.
CPC .................................... *G06N 3/08* (2013.01)

(58) Field of Classification Search
CPC ............ G06N 3/08; G06N 3/063; G06N 3/10; G06N 3/09; G06N 3/098
See application file for complete search history.

(56) References Cited

U.S. PATENT DOCUMENTS

2017/0169358 A1 6/2017 Choi
2018/0018590 A1 1/2018 Szeto
(Continued)

FOREIGN PATENT DOCUMENTS

CN 112685139 A 4/2021
TW 201812646 A 4/2018
(Continued)

OTHER PUBLICATIONS

Luo et al., "Key Frame Extraction of Surveillance Video based on Moving Object Detection and Image Similarity", Pattern Recognition and Image Analysis, 2018, vol. 28, No. 2, pp. 225-231 (Year: 2018).*

(Continued)

*Primary Examiner* — Kakali Chaki
*Assistant Examiner* — Josep Han
(74) *Attorney, Agent, or Firm* — Harrity & Harrity, LLP

(57) ABSTRACT

A system, method, and computer program product for implementing deep learning software model modification is provided. The method includes monitoring operational performance of a software model. An expected confidence level associated with the operational performance is first determined and it is determined that an inference associated with the expected confidence level is below a selected range of inferences associated with assigning new feature data as candidate video data. A candidate sequence comprising video data associated with the candidate video data is received and a similarity between frames of the candidate sequence is determined. A frame comprising a highest similarity with respect to segments of candidate video data is selected and it is detected that the frame is not associated with additional frames stored within a full cache structure. The software model is retrained such that the operational performance is modified.

25 Claims, 10 Drawing Sheets

(51) Int. Cl.

| | |
|---|---|
| ***G06N 3/09*** | (2023.01) |
| ***G06N 3/098*** | (2023.01) |
| ***G06N 3/10*** | (2006.01) |

(56) References Cited

U.S. PATENT DOCUMENTS

| | | | |
|---|---|---|---|
| 2019/0042937 A1 | 2/2019 | Sheller | |
| 2019/0258927 A1 | 8/2019 | Chen | |
| 2020/0242514 A1 | 7/2020 | Mcmahan | |
| 2020/0272896 A1 | 8/2020 | Wei et al. | |
| 2021/0232498 A1 | 7/2021 | Zhang et al. | |
| 2022/0188549 A1 * | 6/2022 | Mishra | G06F 40/35 |

FOREIGN PATENT DOCUMENTS

| | | |
|---|---|---|
| WO | 2017140248 A1 | 8/2017 |
| WO | 2023/017341 A1 | 2/2023 |

OTHER PUBLICATIONS

Chan et al., "A Novel Method to Reduce Redundancy in Adaptive Threshold Clustering Key Frame Extraction Systems" Proceedings of the 2011 International Conference on Machine Learning and Cybernetics, Guilin, Jul. 10-13, 2011 (Year: 2011).*

Batch, "What is batch size in neural network?", edited Apr. 5, 2019 at 14:27, verified on https://web.archive.org/web/20210129055421/https://stats.stackexchange.com/questions/153531/what-is-batch-size-in-neural-network (Year: 2019).*

Casado et al, "Concept drift detection and adaptation for federated and continual learning," arXiv:2105.13309v2 Jul. 15, 2021 (Year: 2021).*

Mohammed et al, "Budgeted Online Selection of Candidate IoT Clients to Participate in Federated Learning," in IEEE Internet of Things Journal, vol. 8, No. 7, pp. 5938-5952, 1 Apr. 1, 2021, doi: 10.1109/JIOT.2020.3036157. (Year: 2021).*

Chen, Zhikun et al.; Semi-Federated Learning; arXiv:2003.12795v1; Mar. 28, 2020; 6 pages.

Lim, Wei Yang Bryan et al; Federated Learning in Mobile Edge Networks: A Comprehensive Survey; arXiv:1909.11875v2; Feb. 28, 2020; 34 pages.

Mell, Peter et al.; "The NIST Definition of Cloud Computing;" National Institute of Standards and Technology; Special Publication 800-145; Sep. 2011; 7 pages.

International Searching Authority, "Notification of Transmittal of the International Search Report and the Written Opinion of the International Searching Authority, or Declaration," Patent Cooperation Treaty, Nov. 16, 2022, 9 pages, International Application No. PCT/IB2022/056754.

S. Teerapittayanon et al., "Distributed Deep Neural Networks over the Cloud, the Edge and End Devices", arXiv, Sep. 6, 2017, 12 pages, doi: https://doi.org/10.48550/arXiv.1709.01921.

* cited by examiner

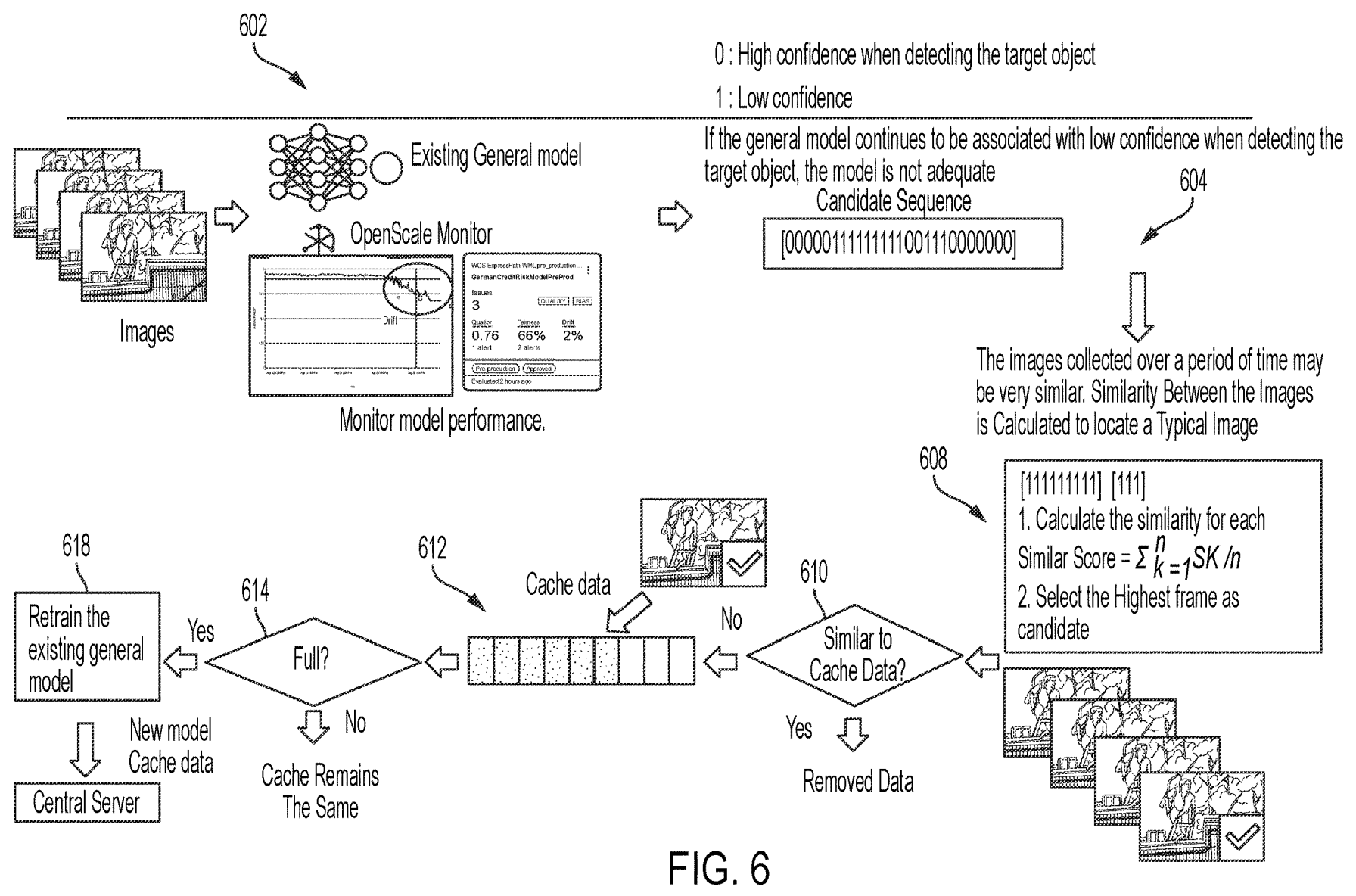

602

0 : High confidence when detecting the target object

1 : Low confidence

Images

Existing General model

OpenScale Monitor

Drift

WOS ExpressPath WML pre_production...

GermanCreditRiskModelPreProd

Issues

3

QUALITY BIAS

Quality 0.76 1 alert

Fairness 66% 2 alerts

Drift 2%

Pre-production Approved

Evaluated 2 hours ago

Monitor model performance.

If the general model continues to be associated with low confidence when detecting the target object, the model is not adequate Candidate Sequence

[00000111111111001110000000]

604

The images collected over a period of time may be very similar. Similarity Between the Images is Calculated to locate a Typical Image

608

[111111111] [111]

1. Calculate the similarity for each

Similar Score = $\Sigma_{k=1}^{n} SK/n$

2. Select the Highest frame as candidate

610

Similar to Cache Data?

Yes

Removed Data

No

Cache data

612

614

Full?

No

Cache Remains The Same

Yes

618

Retrain the existing general model

New model Cache data

Central Server

FIG. 6

DEEP LEARNING SOFTWARE MODEL MODIFICATION

BACKGROUND

The present invention relates generally to a method for automating deep learning software model modification and in particular to a method and associated system for improving software technology associated with monitoring operational performance of a software model; determining that an inference associated with an expected confidence level of the operational performance is below a selected range of inferences associated with assigning new feature data as candidate video data; and retraining the software model such that the operational performance is modified. Typical edge server systems may be enabled to collect data and recognize objects with respect to a deployed learning model. When new data is collected, the data may be transmitted to a central server for re-training. The aforementioned transmitted data may require a lengthy process for uploading. Therefore, a federated learning process may be implemented for deploying a learning model. A federated learning process may require differing federated learning algorithms for different data retrieval scenarios thereby enabling an inaccurate deployment process. Therefore, system 100 enables a semi-federate learning system comprising a data selector component and a federate learning algorithm selector component. The data selector component is configured to generate or retrieve new feature data for re-training a central model. Likewise, the federate learning algorithm selector component is configured to select a best federate learning process for execution with respect to a current dataset. A semi-federate learning process improves an accuracy of a generated edge server model with respect to a data set feature thereby selecting and enabling a best federate learning algorithm. Likewise, the aforementioned semi-federate learning process is configured to reduce traffic associated with uploading data thereby reducing a training time and update with respect to a model.

SUMMARY

A first aspect of the invention provides an edge server comprising a processor coupled to a computer-readable memory unit, the memory unit comprising instructions that when executed by the processor implements an edge device based deep learning software model modification method comprising: monitoring, by the processor, executing an opensource monitor component, operational performance of a software model; determining, by the processor, an expected confidence level associated with the operational performance of the software model; determining, by the processor, that an inference associated with the expected confidence level is below a selected range of inferences associated with assigning new feature data as candidate video data; receiving, by the processor in response to results of the determining that the inference associated with the expected confidence level is below a selected range of inferences, a candidate sequence comprising video data associated with the candidate video data; determining, by the processor, a similarity between frames of the candidate sequence; selecting, by the processor, a frame of the frames comprising a highest similarity with respect to segments of the candidate video data; determining, by the processor, that the frame is not associated with additional frames stored within a cache structure; detecting, by the processor, that the cache structure is full; and retraining, by the processor based on results of the selecting, the determining that the frame is not associated with the additional frames, and the detecting, the software model such that the operational performance is modified.

Some embodiments of the invention further provide an edge server for validating and monitoring an accuracy of an associated learning model and generating a resulting updated learning model. Likewise, some embodiments of the invention are configured to update a central data model resulting in an updated central data model. These embodiments advantageously provide an effective means for accurately updating a currently deployed deep learning model without uploading any related data.

A second aspect of the invention provides an edge device based deep learning software model modification method comprising: monitoring, by a processor of an edge server executing an opensource monitor component, operational performance of a software model; determining, by the processor, an expected confidence level associated with the operational performance of the software model; determining, by the processor, that an inference associated with the expected confidence level is below a selected range of inferences associated with assigning new feature data as candidate video data; receiving, by the processor in response to results of the determining that the inference associated with the expected confidence level is below a selected range of inferences, a candidate sequence comprising video data associated with the candidate video data; determining, by the processor, a similarity between frames of the candidate sequence; selecting, by the processor, a frame of the frames comprising a highest similarity with respect to segments of the candidate video data; determining, by the processor, that the frame is not associated with additional frames stored within a cache structure; detecting, by the processor, that the cache structure is full; and retraining, by the processor based on results of the selecting, the determining that the frame is not associated with the additional frames, and the detecting, the software model such that the operational performance is modified.

Some embodiments of the invention further provide a process for validating and monitoring an accuracy of an associated learning model and generating a resulting updated learning model. Likewise, some embodiments of the invention are configured to update a central data model resulting in an updated central data model. These embodiments advantageously provide an effective means for accurately updating a currently deployed deep learning model without uploading any related data.

A third aspect of the invention provides a computer program product, comprising a computer readable hardware storage device storing a computer readable program code, the computer readable program code comprising an algorithm that when executed by a processor of an edge server an edge device based deep learning software model modification method, the method comprising: monitoring, by the processor, executing an opensource monitor component, operational performance of a software model; determining, by the processor, an expected confidence level associated with the operational performance of the software model; determining, by the processor, that an inference associated with the expected confidence level is below a selected range of inferences associated with assigning new feature data as candidate video data; receiving, by the processor in response to results of the determining that the inference associated with the expected confidence level is below a selected range of inferences, a candidate sequence comprising video data associated with the candidate video data; determining, by the processor, a similarity between frames of the candidate sequence; selecting, by the processor, a frame of the frames comprising a highest similarity with respect to segments of the candidate video data; determining, by the processor, that the frame is not associated with additional frames stored within a cache structure; detecting, by the processor, that the cache structure is full; and retraining, by the processor based on results of the selecting, the determining that the frame is not associated with the additional frames, and the detecting, the software model such that the operational performance is modified.

Some embodiments of the invention further provide a computer program product for validating and monitoring an accuracy of an associated learning model and generating a resulting updated learning model. Likewise, some embodiments of the invention are configured to update a central data model resulting in an updated central data model. These embodiments advantageously provide an effective means for accurately updating a currently deployed deep learning model without uploading any related data.

A fourth aspect of the invention provides a central server comprising a processor coupled to a computer-readable memory unit, the memory unit comprising instructions that when executed by the processor implements a central device based deep learning software model modification method comprising: selecting from a cache memory structure, by the processor, new feature data via execution of a data selector component; validating, by the processor, a data volume of a current dataset resulting in a validated data volume; selecting from a plurality of federated learning algorithms, by the processor, a federated learning algorithm associated with the current dataset; generating, by the processor, new software models with respect to current software models; evaluating, by the processor, the new software models with respect to the validated data volume; ordering, by the processor, metrics associated with the new software models after the evaluating; selecting, by the processor, a specified software model of the new software models; and executing, by the processor, a testing process with respect to the specified software model, wherein the testing process results in operationally enabling the central server.

Some embodiments of the invention further provide a central server for selecting a highest accuracy algorithm from multiple algorithms and assigning the highest accuracy algorithm as a final algorithm for execution. Likewise, some embodiments of the invention are configured to assign a rank to the final algorithm and select the final algorithm for execution with respect to updating central model code. These embodiments advantageously provide an effective means for accurately updating a currently deployed deep learning model without uploading any related data.

A fifth aspect of the invention provides a central device based deep learning software model modification method comprising: selecting from a cache memory structure, by a processor of a central server, new feature data via execution of a data selector component; validating, by the processor, a data volume of a current dataset resulting in a validated data volume; selecting from a plurality of federated learning algorithms, by the processor, a federated learning algorithm associated with the current dataset; generating, by the processor, new software models with respect to current software models; evaluating, by the processor, the new software models with respect to the validated data volume; ordering, by the processor, metrics associated with the new software models after the evaluating; selecting, by the processor, a specified software model of the new software models; and executing, by the processor, a testing process with respect to the specified software model, wherein the testing process results in operationally enabling the central server.

Some embodiments of the invention further provide a process for selecting a highest accuracy algorithm from multiple algorithms and assigning the highest accuracy algorithm as a final algorithm for execution. Likewise, some embodiments of the invention are configured to assign a rank to the final algorithm and select the final algorithm for execution with respect to updating central model code. These embodiments advantageously provide an effective means for accurately updating a currently deployed deep learning model without uploading any related data.

The present invention advantageously provides a simple method and associated system capable of automating deep learning software model modification.

BRIEF DESCRIPTION OF THE DRAWINGS

FIG. 6 illustrates an edge server based process enabled by the system of FIG. 1, in accordance with embodiments of the present invention

DETAILED DESCRIPTION

Figure 1:
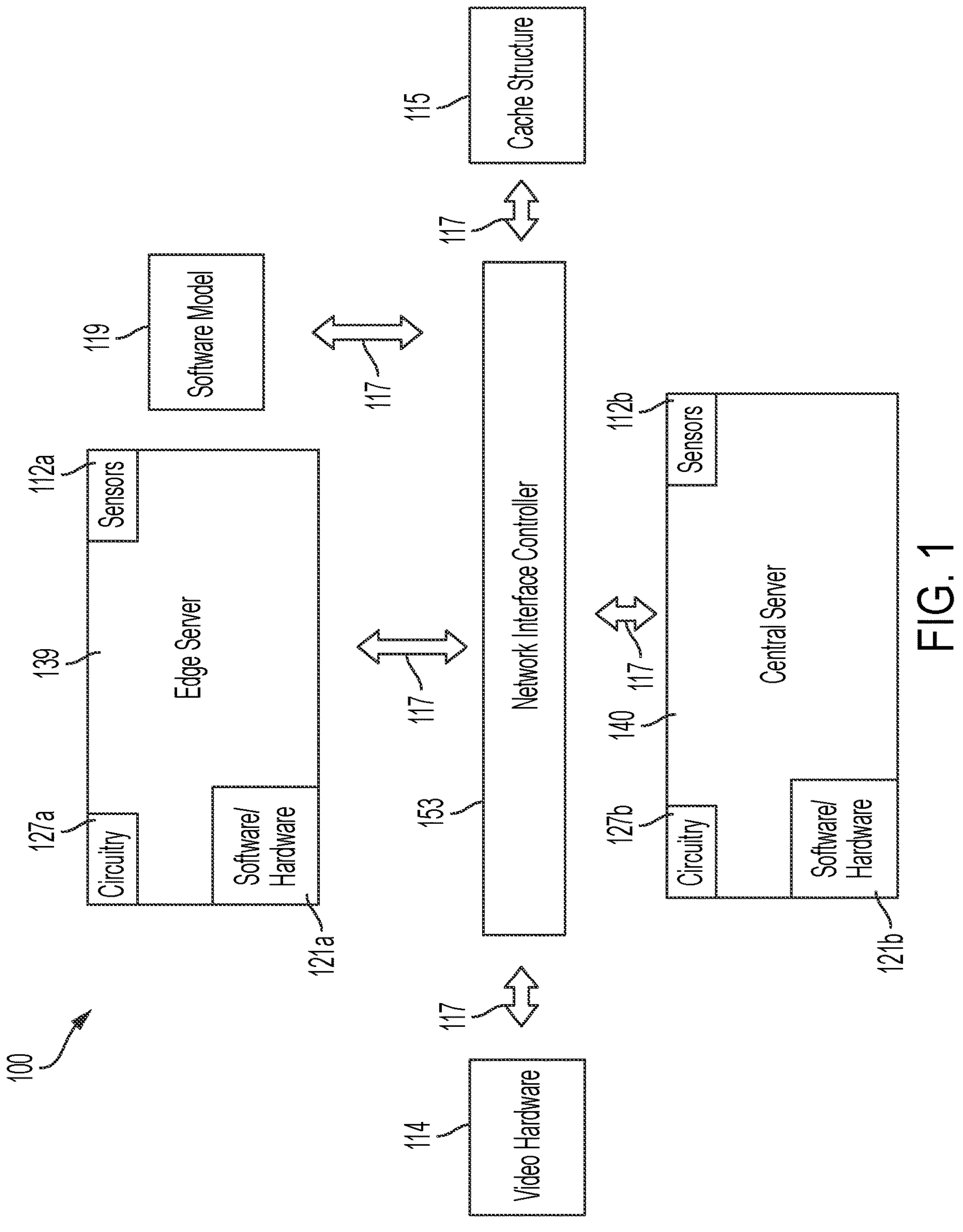
FIG. 1 illustrates a system for improving software technology associated with monitoring operational performance of a software model; determining that an inference associated with an expected confidence level of the operational performance is below a selected range of inferences associated with assigning new feature data as candidate video data; and retraining the software model such that the operational performance is modified, in accordance with embodiments of the present invention.

FIG. 1 illustrates a system 100 for improving software technology associated with monitoring operational performance of a software model; determining that an inference associated with an expected confidence level of the operational performance is below a selected range of inferences associated with assigning new feature data as candidate video data; and retraining the software model such that the operational performance is modified, in accordance with embodiments of the present invention. Typical server systems may be enabled to collect data and recognize objects with respect to a deployed learning model such that data may be transmitted to a central server for re-training. The aforementioned transmitted data may require a lengthy process for uploading. Furthermore, processes configured to update models without uploading data may require different algorithms for different data scenarios thereby decreasing a training process accuracy. Therefore system 100 is configured to: update deep learning models based on executing semi-federated training code by uploading new features for selecting federate processes and validating a re-trained model.

System 100 of FIG. 1 includes an edge server 139, a central Server 140, video hardware 114, a cache structure 115, a software model 119, and network interface controller interconnected through a network 7. Edge server 139 comprises sensors 112*a*, circuitry 127*a*, and software/hardware 121*a*. Central server 139 comprises sensors 112*b*, circuitry 127*b*, and software/hardware 121*b*. Video hardware 114 may comprise a remote video source system (e.g., a video storage system, a video streaming system, a video projector, etc.) configured to provide video data (e.g., a video image, a video stream, etc.). Edge server 139 and central Server 140 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, edge server 139 and central Server 140 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-10. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software technology associated with monitoring operational performance of a software model; determining that an inference associated with an expected confidence level of the operational performance is below a selected range of inferences associated with assigning new feature data as candidate video data; and retraining the software model such that the operational performance is modified. Sensors 112*a* and 112*b* may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to execute a process for updating and re-training a deep learning model based on execution of semi-federate learning code. The process includes:

1. Selecting new feature data by enabling a data selector component for validating and monitoring an accuracy of a learning model for updating and re-training the learning model.
2. Selecting a best algorithm (of multiple federated algorithms) via execution of a federated learning algorithm selector component for updating a central model and transmitting feedback to an edge model.
3. Enabling an opensource monitor component (e.g., an open scale component configured to operate and automate artificial intelligence (AI) at scale regardless of how the AI was built and where it runs) for assigning an expected confidence attribute and determining if an inference detected to be less than a selected range for considering the new feature data as a candidate frame.
4. Receiving a candidate sequence for videos or images. Segments (of the videos or images) within the candidate sequence may be recognized as new features.
5. Selecting an image (of the videos or images) comprising a highest similarity with other images within the segments as candidate data. The candidate data may be recorded as new feature data if the candidate data comprises low similarity with previous candidate from additional videos or images.
6. Determining if a size of the feature data exceeds a threshold and invoking re-train local model execution for transmitting an updated dataset and associated model parameters to a central server model.
7. Enabling a federated algorithm selector component to select an appropriate algorithm for a current dataset at a server-side. An appropriate algorithm may include: an algorithm library covers all federate learning method, a validated data volume comprising a collection from a cache on an edge server side, and an auto algorithm validator component.
8. Updating a central model based on a selected federated algorithm from the algorithm library and executing a testing process based on validated data using the auto algorithm validator component. Likewise, a highest accuracy algorithm may be selected as a final algorithm.
9. Ordering an algorithm from the auto algorithm validator component and selecting a highest ranked algorithm for updating a central model using a rank and the federated algorithm selector component.

Figure 2:
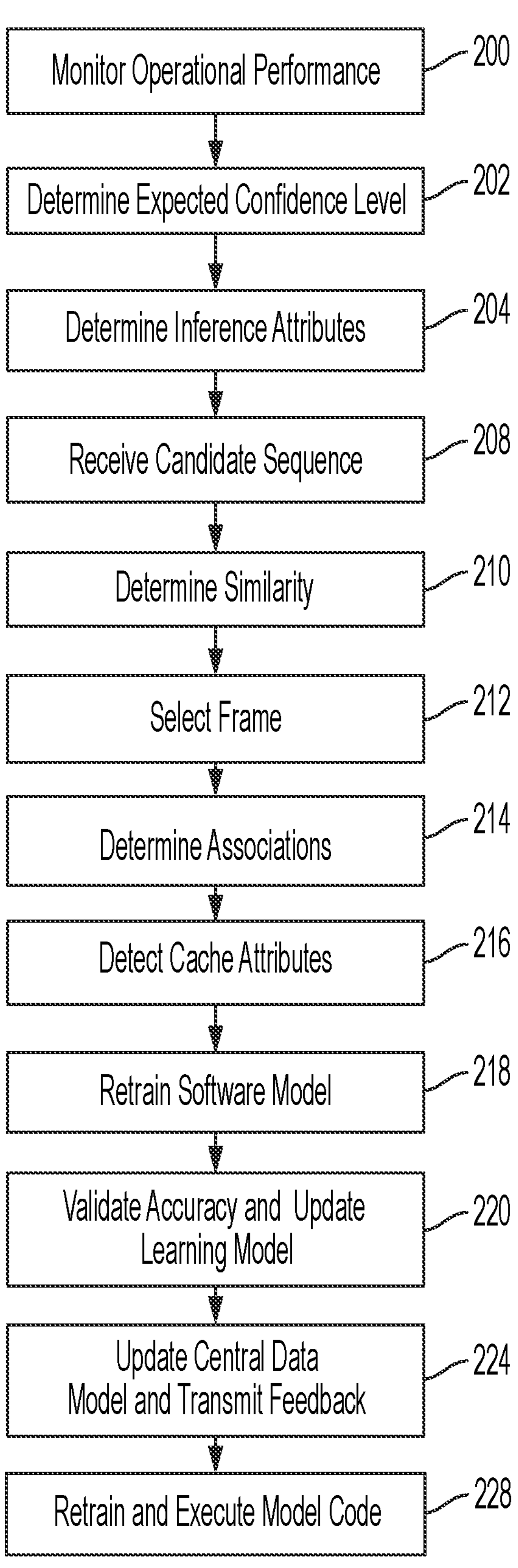
FIG. 2 illustrates an algorithm detailing a process flow enabled by the system of FIG. 1 for improving software technology associated with executing an edge device based deep learning software model modification process, in accordance with embodiments of the present invention.

FIG. 2 illustrates an algorithm detailing a process flow enabled by system 100 of FIG. 1 for improving software technology associated with executing an edge device based deep learning software model modification process, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by edge server 139 and central server 140. In step 200, operational performance of a software model is monitored by an edge server executing an opensource monitor component. The opensource monitor component is configured to operate and automate artificial intelligence code with respect to a specified scale.

In step 202, an expected confidence level associated with the operational performance of the software model is determined. In step 204, it is determined that an inference associated with the expected confidence level is below a selected range of inferences associated with assigning new feature data as candidate video data. The candidate video data may include, inter alia, at least one video image, a video stream, etc.

In step 208, a candidate sequence comprising video data associated with the candidate video data is received in response to results of step 204. Video segments within the candidate sequence may be associated with new features of new feature data.

In step 210, similarity attributes between frames of the candidate sequence are determined. In step 212, a frame comprising a highest similarity attribute with respect to segments of the candidate video data is selected. In step 214, it is determined that the selected frame is not associated with additional frames stored within a cache structure. In step 216, it is determined that the cache structure is full. In step 218, the software model is retrained (in response to results of the aforementioned steps) such that the operational performance (of the software model) is modified.

In step 220, an accuracy of a learning model (associated with the software model) is monitored and validated and a resulting updated learning model is generated from the learning model with respect to the monitored accuracy. The updated learning model is configured to execute future instances of the edge based deep learning software model modification process.

In step 224, a central data model associated with the software model is updated resulting in an updated central data model. Associated feedback is transmitted to an edge model for operation of the software model after the retraining of step 218.

In step 228, it is determined that a data size of new feature data exceeds a threshold size. In response, re-train local model code is executed with respect to a central data model and a resulting updated central data model and associated parameters are transmitted to a central server.

Figure 3:
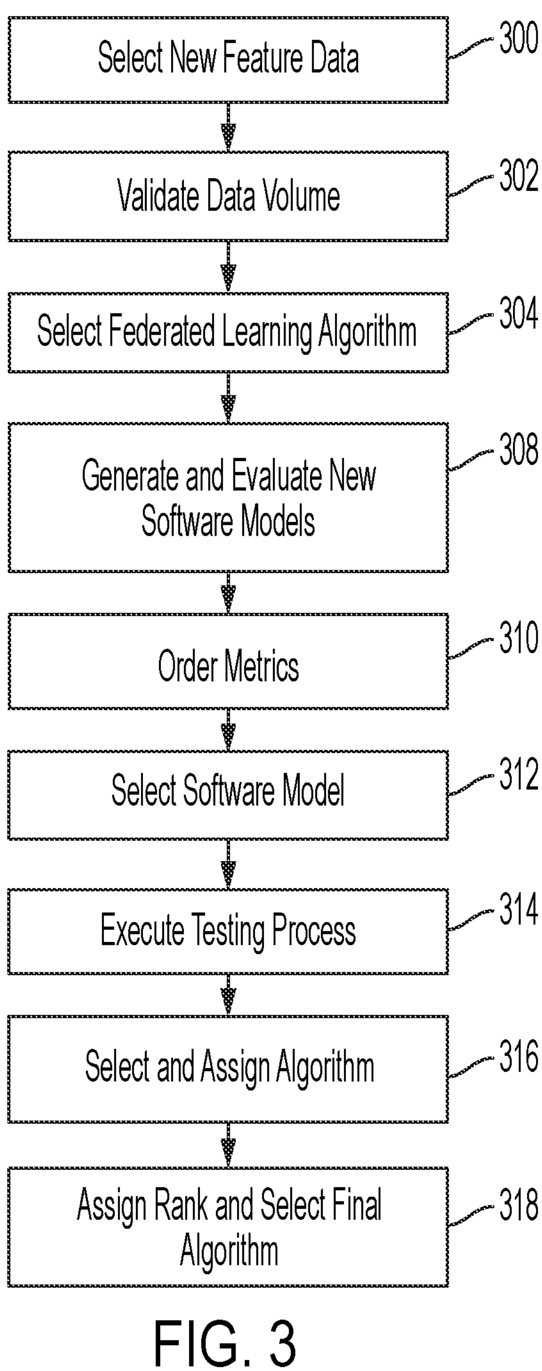
FIG. 3 illustrates an algorithm detailing a process flow enabled by the system of FIG. 1 for improving software technology associated with executing a central device based deep learning software model modification process, in accordance with embodiments of the present invention.

FIG. 3 illustrates an algorithm detailing a process flow enabled by system 100 of FIG. 1 for improving software technology associated with executing a central device based deep learning software model modification process, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by edge server 139 and central server 140. In step 300, new feature data is selected from a cache memory structure via execution of a data selector component of a central server. The cache data structure is comprised by an edge server communicating with the central server.

In step 302, a data volume of a current dataset is validated resulting in a validated data volume. The data volume comprises a data collection of cache data (of the cache data structure) and an auto algorithm validator cache memory structure.

In step 304, a federated learning algorithm is selected from a plurality of federated learning algorithms. The federated learning algorithm is associated with the current dataset. In step 308, new software models are generated with respect to current software models. The new software models are evaluated with respect to the validated data volume. In step 310, metrics associated with new software models are rearranged and ordered in accordance with the validated data volume. In step 312, a specified software model is selected from the new software models. In step 314, a testing process is executed with respect to the specified software model thereby resulting in operationally enabling the central server.

In step 316, a highest accuracy algorithm is selected from federated learning algorithms based on results of executing the testing process. The highest accuracy algorithm is assigned as a final algorithm for execution. In step 318, a rank is assigned to the final algorithm with respect to the federated learning algorithms. The final algorithm is selected for execution with respect to updating central model code via executing a rank and federated algorithm selector component.

Figure 4:
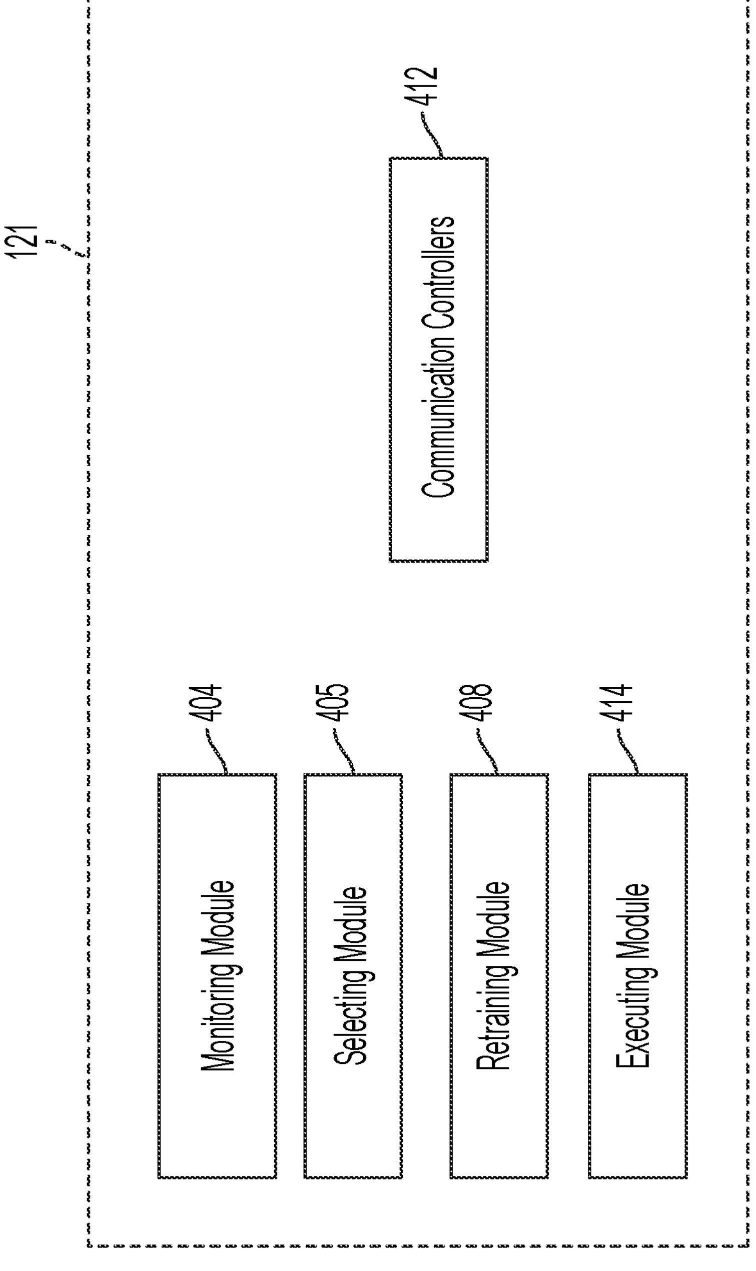
FIG. 4 illustrates an internal structural view of the software/hardware of FIG. 1, in accordance with embodiments of the present invention.

FIG. 4 illustrates an internal structural view of software/hardware 121 (i.e., 121*a* and/or 121*b*) of FIG. 1, in accordance with embodiments of the present invention. Software/hardware 121 includes a monitoring module 404, a selecting module 405, a retraining module 408, an executing module 414, and communication controllers 412. Monitoring module 404 comprises specialized hardware and software for controlling all functions related to the monitoring steps of FIG. 2. Selecting module 405 comprises specialized hardware and software for controlling all functionality related to the selection steps described with respect to the algorithm of FIG. 2. Retraining module 408 comprises specialized hardware and software for controlling all functions related to the retraining and updating steps of FIG. 2. Executing module 414 comprises specialized hardware and software for controlling all functions related to the execution steps of the algorithm of FIG. 2. Communication controllers 412 are enabled for controlling all communications between monitoring module 404, selecting module 405, retraining module 408, and executing module 414.

Figure 5:
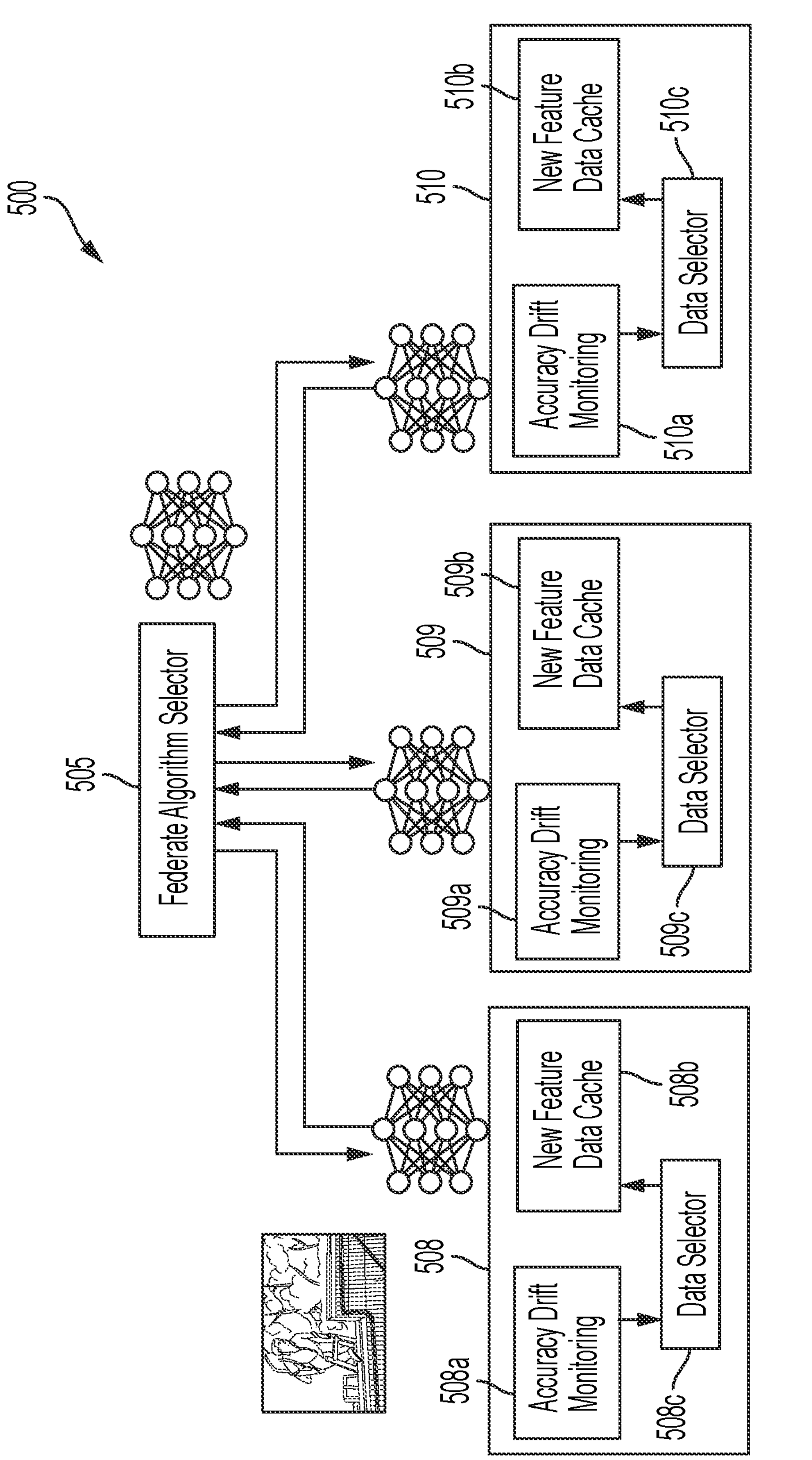
FIG. 5 illustrates a system configured to re-train and validate a model, in accordance with embodiments of the present invention.

FIG. 5 illustrates a system 500 configured to re-train and validate a model, in accordance with embodiments of the present invention. System 500 comprises a federate learning algorithm selector component 505 connected to data selection and monitoring components 508, 509, and 510. System 500 is configured to enable a semi-federate process associated with uploading new feature data to determine a federate method to be selected. Additionally, system 500 is configured to validate a re-trained model. Federate learning algorithm selector component 505 is configured to select a best algorithm (from federate algorithms) for updating a central model and providing associated feedback to an edge model. Data selection and monitoring component 508 comprises an accuracy drift monitoring component 508*a*, a new feature data cache component 508*b*, and a data selector component 508*c*. Data selection and monitoring component 509 comprises an accuracy drift monitoring component 509*a*, a new feature data cache component 509*b*, and a data selector component 509*c*. Data selection and monitoring component 510 comprises an accuracy drift monitoring component 510*a*, a new feature data cache component 510*b*, and a data selector component 510*c*. Each of data selector components 508*c*, 509*c*, and 510*c* comprises a data selector component configured to select new feature data for validating a data volume. Each of accuracy drift monitoring components 508*a*, 509*a*, and 510*a* is configured to monitor an accuracy of a current model and determine if the current model requires updating and re-training.

FIG. 6 illustrates an edge server based process enabled by system 100 of FIG. 1, in accordance with embodiments of the present invention. In step 602, a performance of an existing model (comprising a plurality of images) is monitored and an opensource monitor component is configured to assign an expected confidence attribute to the existing model if an inference is less than a candidate frame (of the plurality of images). In step 604, a candidate sequence for a video (comprising the plurality of images) is assigned new features. In step 608, an image comprising a highest similarity with respect to additional images is selected. The similarity attributes may be determined in step 608. In step 610, it is determined if the similarity attributes are similar to data within a cache structure. If it is determined that the similarity attributes are similar to data within the cache structure, then the data is removed from the cache structure. If it is determined that the similarity attributes are not similar to the data within the cache structure, then the unique cache data remains in the cache in step 612 and in step 614, it is determined if the cache is full. If the cache is determined to be full then in step 618, the existing model is retrained and transmitted (with an updated dataset and model parameters) to a central server model.

Figure 7:
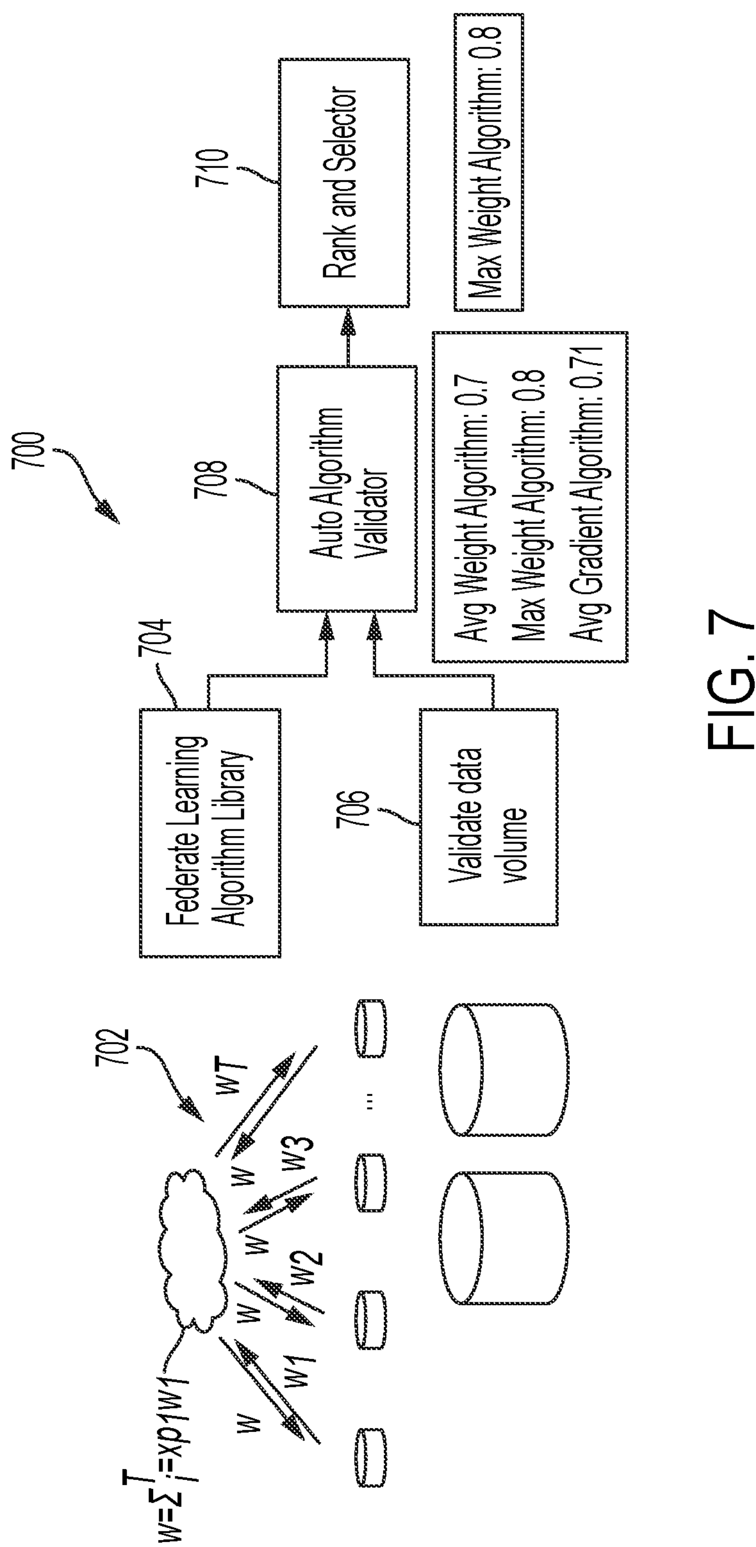
FIG. 7 illustrates central server based system/process enabled by the system of FIG. 1, in accordance with embodiments of the present invention.
Figure 8:
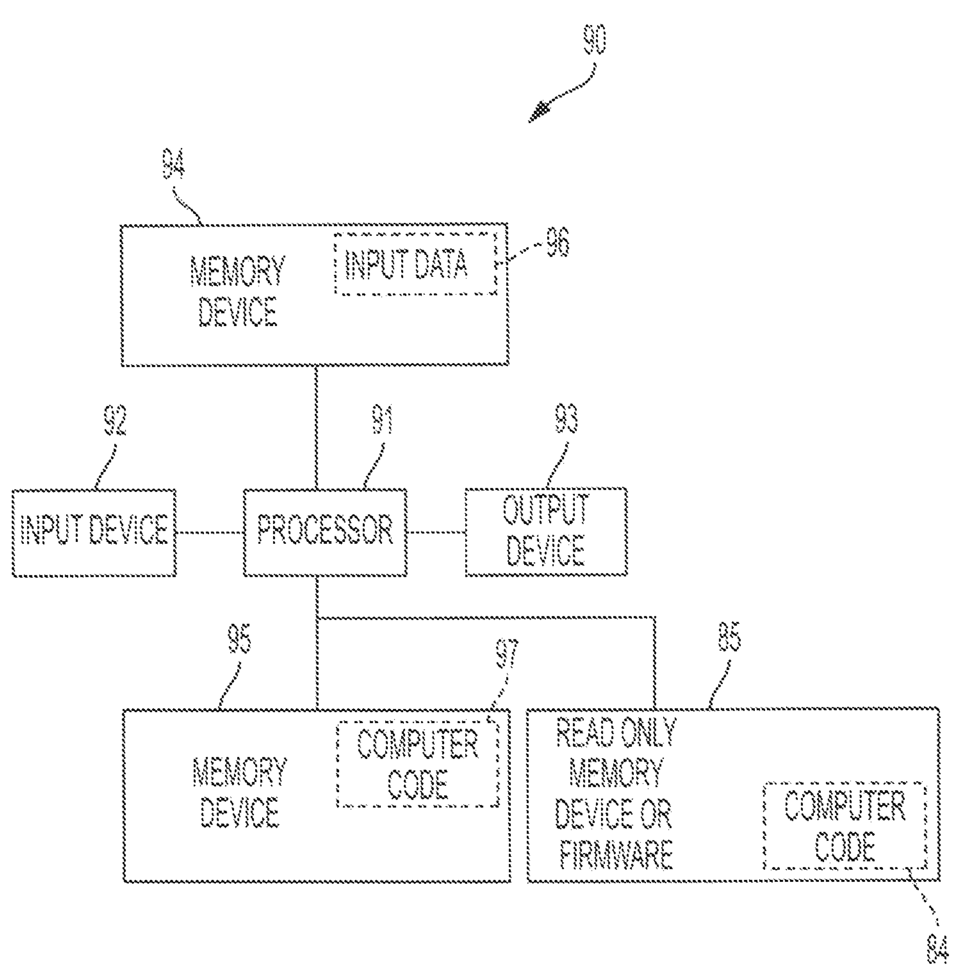
FIG. 8 illustrates a computer system used by the system of FIG. 1 for improving software technology associated with executing an edge device and/or central server based deep learning software model modification process, in accordance with embodiments of the present invention.

FIG. 7 illustrates central server based system/process 700 enabled by system 100 of FIG. 1, in accordance with embodiments of the present invention. System/process 700 comprises a federate algorithm selector system 702 for selecting an appropriate algorithm for current dataset scenarios. Federate algorithm selector system 702 comprises a federate learning algorithm library 704, a validate data volume component 706, an auto algorithm validator component 708, and a rank and selector component 710. Federate learning algorithm library 704 is configured to execute federate learning code. Validate data volume component 706 comprises a collection of cache data within an edge server. Auto algorithm validator component 708 is configured to update a central model based on a selected federated algorithm from federate learning algorithm library 704. The selected federated algorithm is tested based on validated data and a highest accuracy algorithm is selected as a final algorithm. Rank and selector component 710 is configured to order a score from validate data volume component 706 and select a highest score for updating a central model FIG. 8 illustrates a computer system 90 (e.g., edge server 139 and central server 140 of FIG. 1) used by or comprised by the system 100 of FIG. 1 for improving software technology associated with executing an edge device and/or central server based deep learning software model modification process, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for improving software technology associated with executing an edge device and/or central server based deep learning software model modification process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithms of FIGS. 2 and 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with executing an edge device and/or central server based deep learning software model modification process. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with executing an edge device and/or central server based deep learning software model modification process. In another embodiment, the invention provides a business method that performs the process steps of the invention on a subscription, advertising, and/or fee basis. That is, a service supplier, such as a Solution Integrator, could offer to enable a process for improving software technology associated with executing an edge device and/or central server based deep learning software model modification process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
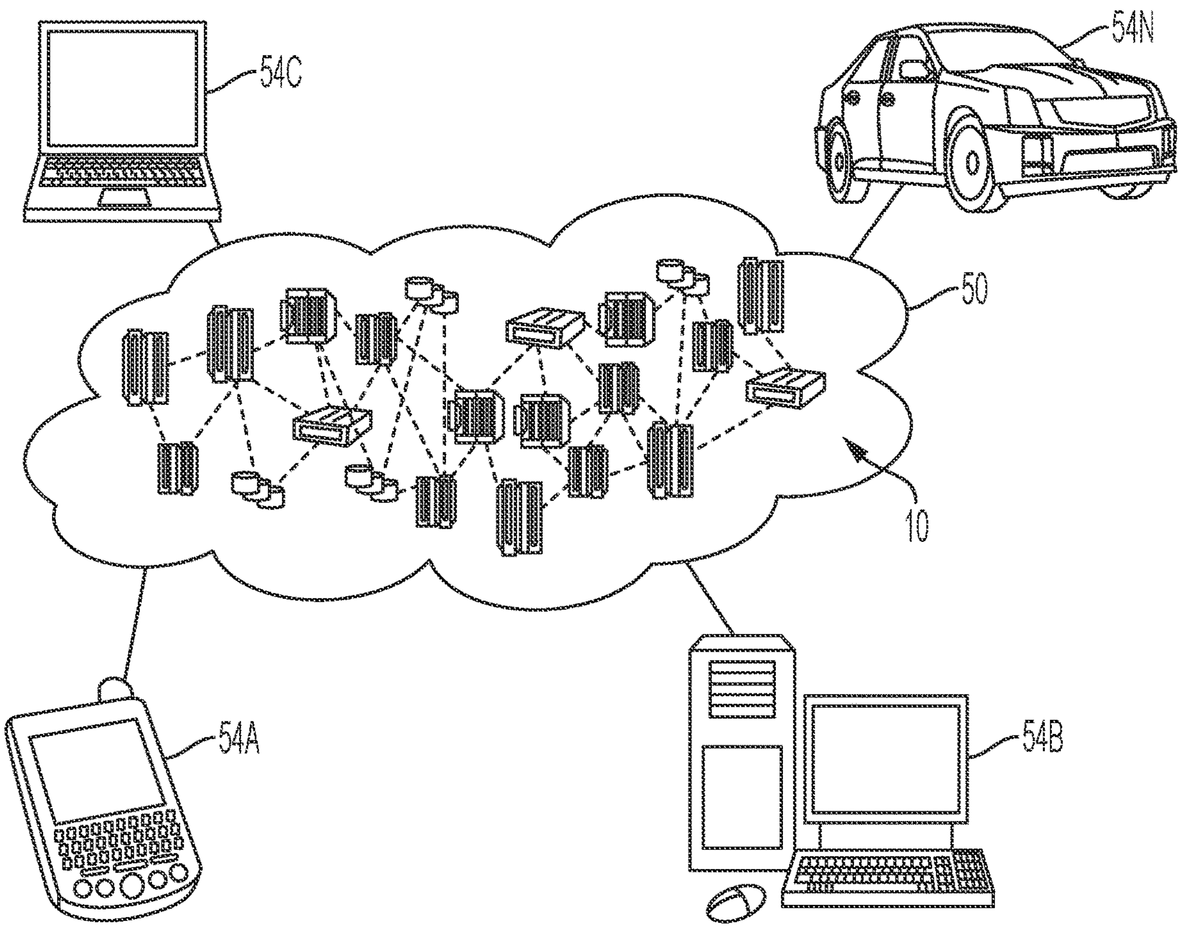
FIG. 9 illustrates a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 10:
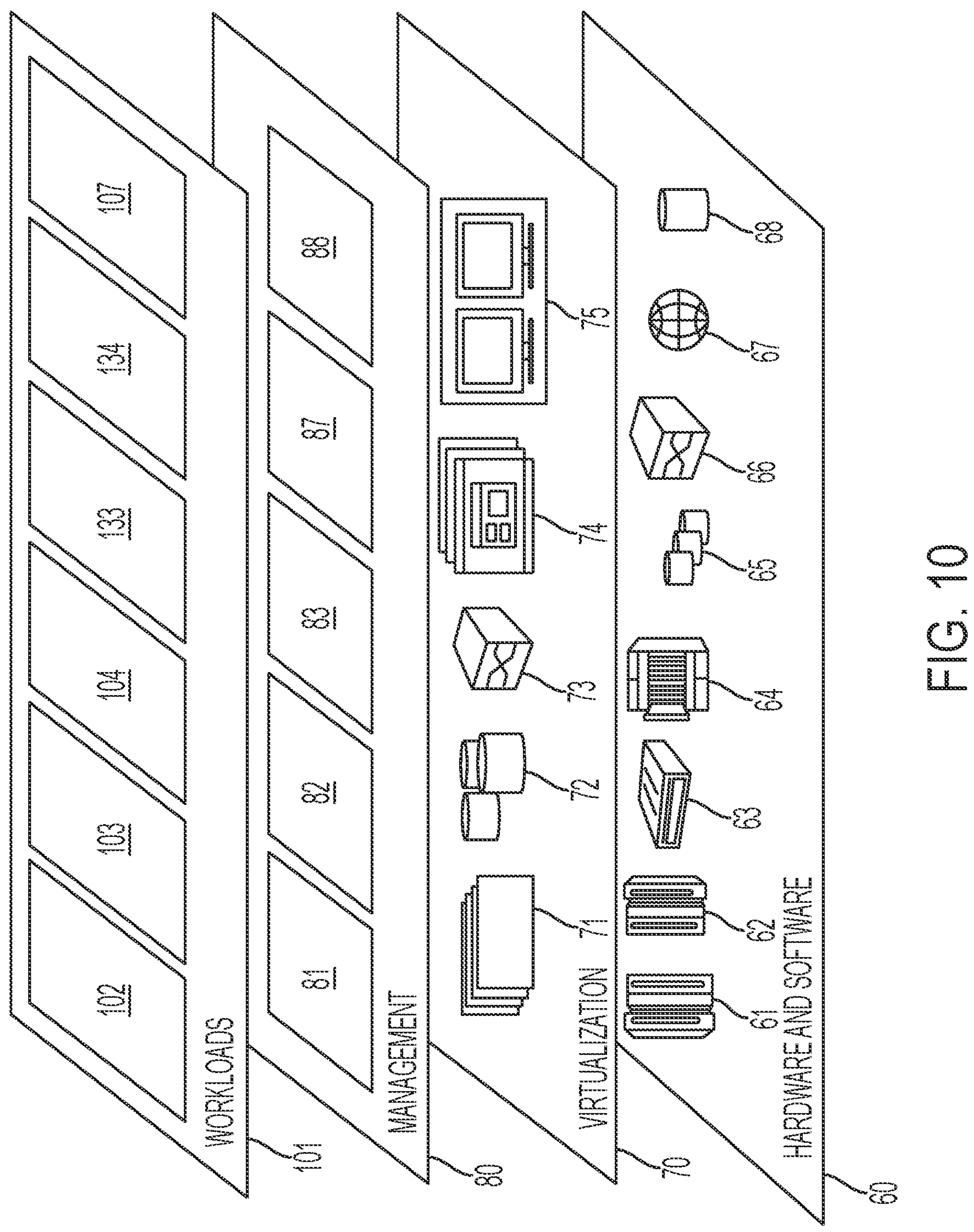
FIG. 10 illustrates a set of functional abstraction layers provided by cloud computing environment, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software technology associated with executing an edge device and/or central server based deep learning software model modification process 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An edge server comprising:

one or more processors; and one or more memory devices coupled to the one or more processors, wherein the one or more processors are configured to:

execute an opensource monitor component;

monitor an operational performance of a deep learning software model using the opensource monitor component;

determine an expected confidence level of the operational performance of the deep learning software model;

determine that an inference associated with the expected confidence level is below a selected range of inferences associated with assigning new feature data as candidate video data;

receive a candidate sequence comprising video data associated with the candidate video data, in response to the determination that the inference associated with the expected confidence level is below the selected range of inferences;

determine a similarity between a plurality of frames of the candidate sequence;

select a frame from the plurality of frames comprising a highest similarity with respect to segments of the candidate video data;

determine that the frame is not associated with additional frames stored within a cache memory structure;

detect that the cache memory structure is full;

retrain, the deep learning software model, based on results of the determining that the frame is not associated with the additional frames stored within the cache memory structure, and based on the detecting that the cache memory structure is full;

update, based on the retraining, a central data model associated with the deep learning software model at the edge server; and transmit the updated central data model and associated parameters to a central server based on the detecting that the cache memory structure is full.

2. The edge server of claim 1, wherein the one or more processors are further configured to:

validate an accuracy of a learning model; and generate an updated learning model from the learning model with respect to the accuracy, wherein the updated learning model is configured to execute future instances of edge based deep learning software model modification.

3. The edge server of claim 1, wherein the opensource monitor component is configured to operate and automate artificial intelligence code with respect to a specified scale.

4. The edge server of claim 1, wherein video segments within the candidate sequence are associated with new features of the new feature data.

5. The edge server of claim 1, wherein the candidate video data comprises video data selected from the group consisting of at least one video image and a video stream.

6. An edge server based deep learning software model modification method comprising:

monitoring, by a processor of the edge server executing an opensource monitor component, operational performance of the deep learning software model;

determining, by the processor, an expected confidence level of the operational performance of the deep learning software model;

determining, by the processor, that an inference associated with the expected confidence level is below a selected range of inferences associated with assigning new feature data as candidate video data;

receiving, by the processor in response to results of the determining that the inference associated with the expected confidence level is below the selected range of inferences, a candidate sequence comprising video data associated with the candidate video data;

determining, by the processor, a similarity between a plurality of frames of the candidate sequence;

selecting, by the processor, a frame from the plurality of frames comprising a highest similarity with respect to segments of the candidate video data;

determining, by the processor, that the frame is not associated with additional frames stored within a cache memory structure;

detecting, by the processor, that the cache memory structure is full;

retraining, by the processor, the deep learning software model based on results of the determining that the frame is not associated with the additional frames stored within the cache memory structure, and based on the detecting that the cache memory structure is full;

updating, by the processor, based on the retraining, a central data model associated with the deep learning software model at the edge server; and transmitting updated central data model and associated parameters to a central server based on the detecting that the cache memory structure is full.

7. The method of claim 6, further comprising: validating and monitoring, by the processor, an accuracy of a learning model; and generating, by the processor, an updated learning model from the learning model with respect to the accuracy, wherein the updated learning model is configured to execute future instances of the edge based deep learning software model modification method.

8. The method of claim 6, wherein the opensource monitor component is configured to operate and automate artificial intelligence code with respect to a specified scale.

9. The method of claim 6, wherein video segments within the candidate sequence are associated with new features of the new feature data.

10. The method of claim 6, wherein the candidate video data comprises video data selected from the group consisting of at least one video image and a video stream.

11. The method of claim 6, further comprising: providing at least one support service for at least one of creating, integrating, hosting, maintaining, and deploying computer-readable code in the edge server, the code being executed by the processor to implement: the monitoring, the receiving, the selecting, and the retraining.

12. A computer-readable medium storing a set of instructions for deep learning software model modification, the set of instructions comprising:

one or more instructions that, when executed by one or more processors of an edge server, cause the edge server to:

monitor an operational performance of a deep learning software model;

determine an expected confidence level of the operational performance of the deep learning software model;

determine that an inference associated with the expected confidence level is below a selected range of inferences associated with assigning new feature data as candidate video data;

receive a candidate sequence comprising video data associated with the candidate video data, in response to results of the determining that the inference associated with the expected confidence level is below the selected range of inferences;

determine a similarity between a plurality of frames of the candidate sequence;

select a frame from the plurality of frames comprising a highest similarity with respect to segments of the candidate video data;

determine that the frame is not associated with additional frames stored within a cache memory structure;

detect that the cache memory structure is full;

retrain the deep learning software model based on results of the determining that the frame is not associated with the additional frames stored within the cache memory structure, and based on the detecting that the cache memory structure is full;

update, based on the retraining, a central data model associated with the deep learning software model at the edge server; and transmit the updated central data model and associated parameters to a central server based on the detecting that the cache memory structure is full.

13. The computer-readable medium of claim 12, wherein the one or more instructions cause the edge server to:

validate an accuracy of a learning model; and generate an updated learning model from the learning model with respect to the accuracy, wherein the updated learning model is configured to execute future instances of edge based deep learning software model modification.

14. The computer-readable medium of claim 12, wherein the one or more instructions cause the edge server to configure an opensource monitor component to operate and automate artificial intelligence code with respect to a specified scale.

15. The computer-readable medium of claim 12, wherein video segments within the candidate sequence are associated with new features of the new feature data.

16. A server comprising:

one or more memory devices; and one or more processors coupled to the one or more memory devices, the one or more processors configured to:

determine an expected confidence level of an operational performance of a software model;

determine that an inference associated with the expected confidence level is below a selected range of inferences associated with assigning new feature data as candidate video data;

receive a candidate sequence comprising video data associated with the candidate video data, in response to the determination that the inference associated with the expected confidence level is below the selected range of inferences;

determine a similarity between a plurality of frames of the candidate sequence;

select a frame from the plurality of frames comprising a highest similarity with respect to segments of the candidate video data;

determine that the frame is not associated with additional frames stored within a cache memory structure;

detect that the cache memory structure is full;

retrain, the software model, based on results of the determining that the frame is not associated with the additional frames stored within the cache memory structure, and based on the detecting that the cache memory structure is full;

update, based on the retraining, a central data model associated with the software model at the server; and transmit the updated central data model and associated parameters to a central server based on the detecting that the cache memory structure is full.

17. The server of claim 16, wherein the software model is a deep learning software model.

18. The server of claim 16, wherein video segments within the candidate sequence are associated with new features of the new feature data.

19. The server of claim 16, wherein the one or more processors are further configured to:

validate an accuracy of a learning model; and generate an updated learning model from the learning model with respect to the accuracy, wherein the updated learning model is configured to execute future instances of edge based deep learning software model modification.

20. The server of claim 16, wherein the candidate video data comprises video data selected from the group consisting of at least one video image and a video stream.

21. A method comprising:

determining, by a processor of a server, an expected confidence level of an operational performance of a software model;

determining, by the processor, that an inference associated with the expected confidence level is below a selected range of inferences associated with assigning new feature data as candidate video data;

receiving, by the processor, in response to results of the determining that the inference associated with the expected confidence level is below the selected range of inferences, a candidate sequence comprising video data associated with the candidate video data;

determining, by the processor, a similarity between a plurality of frames of the candidate sequence;

selecting, by the processor, a frame from the plurality of frames comprising a highest similarity with respect to segments of the candidate video data;

determining, by the processor, that the frame is not associated with additional frames stored within a cache memory structure;

detecting, by the processor, that the cache memory structure is full;

retraining, by the processor, the software model based on results of the determining that the frame is not associated with the additional frames stored within the cache memory structure, and based on the detecting that the cache memory structure is full;

updating, by the processor, based on the retraining, a central data model associated with the software model at the server; and transmitting updated central data model and associated parameters to a central server based on the detecting that the cache memory structure is full.

22. The method of claim 21, wherein the software model is a deep learning software model.

23. The method of claim 21, further comprising:

validating and monitoring, by the processor, an accuracy of a learning model; and generating, by the processor, an updated learning model from the learning model with respect to the accuracy.

24. The method of claim 21, wherein video segments within the candidate sequence are associated with new features of the new feature data.

25. The method of claim 21, wherein the candidate video data comprises video data selected from the group consisting of at least one video image and a video stream.

* * * * *